Feb. 18, 1964     B. T. HERBST     3,121,304
TREE SHAKER
Filed Jan. 29, 1962     2 Sheets-Sheet 1
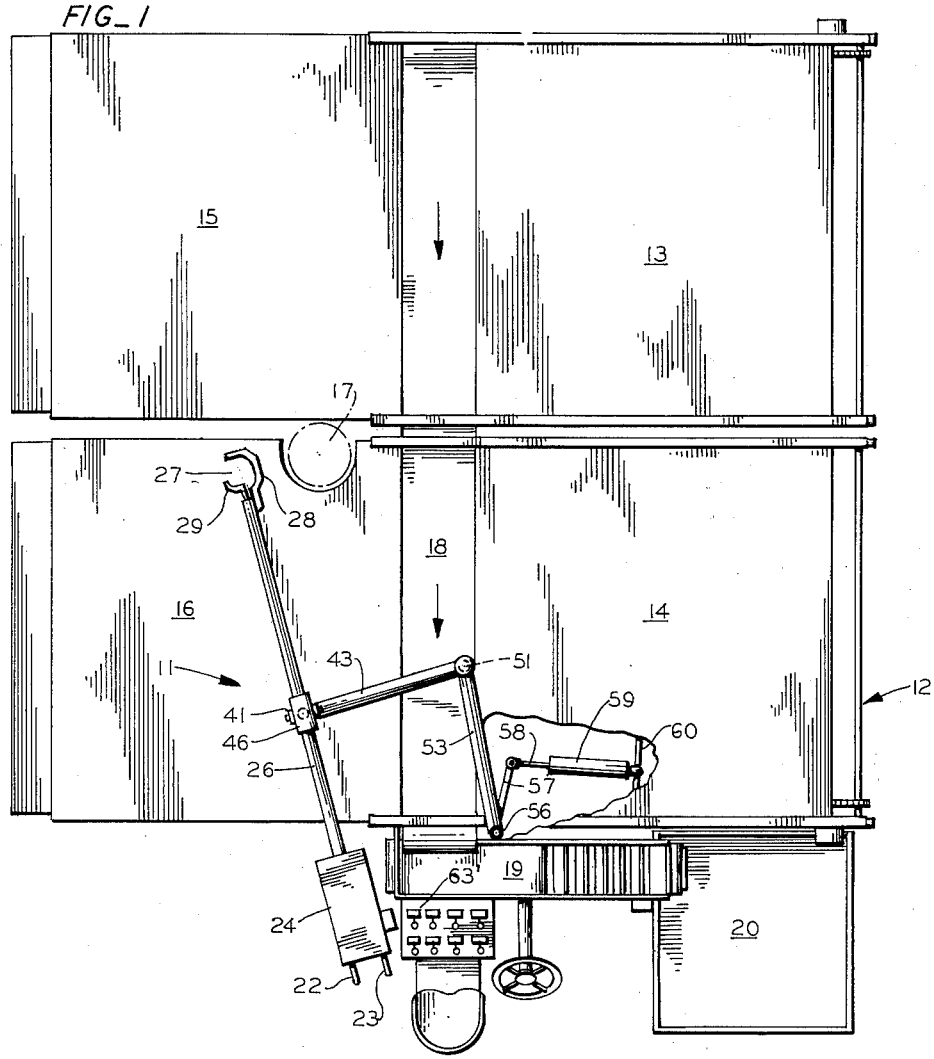
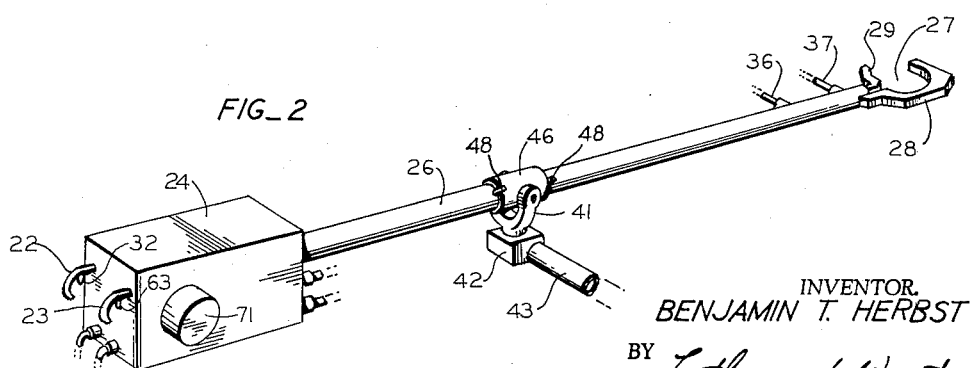
INVENTOR.
BENJAMIN T. HERBST
BY Lothrop & West
ATTORNEYS Feb. 18, 1964    B. T. HERBST    3,121,304
TREE SHAKER
Filed Jan. 29, 1962    2 Sheets-Sheet 2
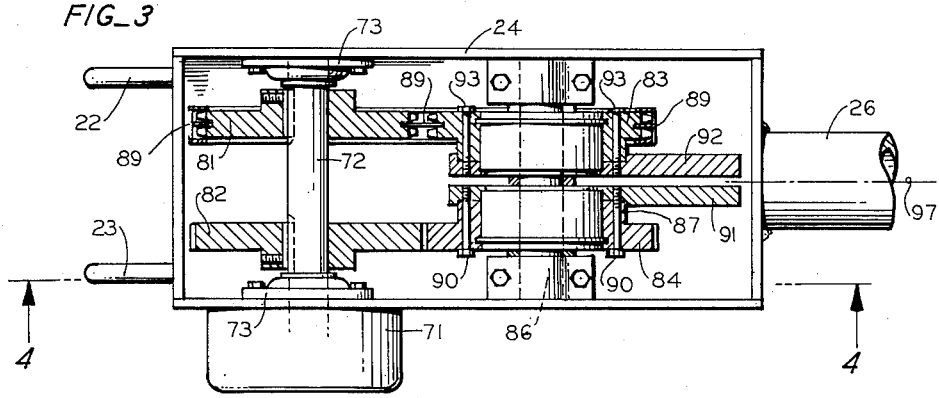
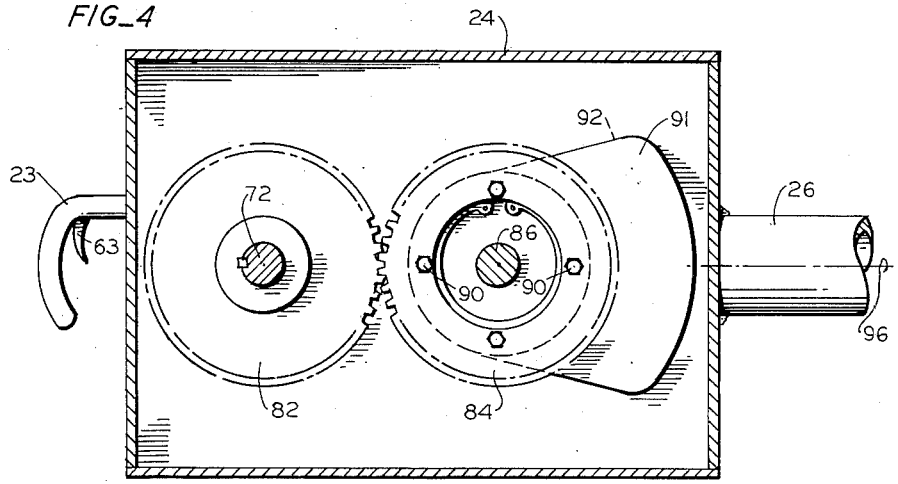
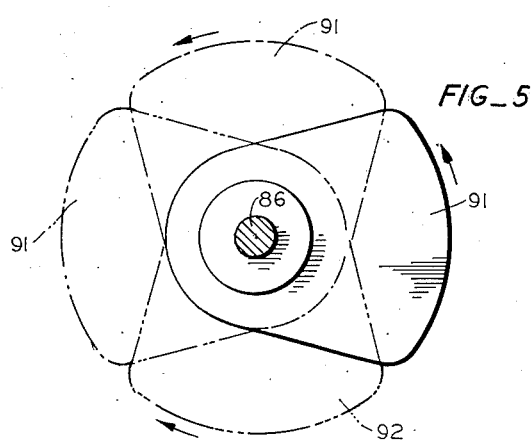
INVENTOR.
BENJAMIN T. HERBST
BY Lothrop & West
ATTORNEYS

United States Patent Office 3,121,304
Patented Feb. 18, 1964

3,121,304
TREE SHAKER
Benjamin T. Herbst, P.O. Box 17, Esparto, Calif.
Filed Jan. 29, 1962, Ser. No. 169,263
3 Claims. (Cl. 56—328)

The invention relates to devices for shaking fruit and nut bearing trees and is particularly adapted for use with apparatus placed underneath the tree branches to catch the fruit or nuts dislodged from the tree as shaking takes place.

Many kinds of tree shakers have heretofore been used and, while these shakers have served in large measure to reduce the labor cost involved in hand-knocking, or hitting the branches with sticks, they nevertheless have certain disadvantages.

Ordinarily, these shakers have been mounted on their own self-propelled unit, this being necessary, heretofore, to enable all of the branches to be grasped properly for shaking. These self-contained units are expensive since each shaker requires its own separate vehicle.

Furthermore, the previously used shakers have, by and large, caused damage to the trees owing to the kind and amplitude of the shaking effort exerted on the trees.

It is therefore an object of the invention to provide a tree shaker which can be mounted on and act in cooperation with a fruit or nut catching machine.

It is another object of the invention to provide a tree shaker which is highly flexible in operation.

It is yet another object of the invention to provide a tree shaker in which the operator can carefully and nicely regulate the amount and kind of tree shaking effort.

It is still another object of the invention to provide a tree shaker which is so mounted and controlled as to permit its use, even for extended periods, with a minimum of operator fatigue.

It is a further object of the invention to provide a tree shaker which is, relatively speaking, quite inexpensive both with respect to initial cost and upkeep.

It is another object of the invention to provide a generally improved tree shaker.

Other objects, together with the foregoing, are attained in the embodiment described in the following description and shown in the accompanying drawings, in which:

FIGURE 1 is a top, plan view of the shaker device, shown in a typical environment, namely, mounted on a self-propelled harvesting apparatus, a portion of the harvester structure being broken away to reveal the plunger mechanism adapted to move the tree shaker;

FIGURE 2 is a fragmentary perspective view of the boom and shaker box elements, portions of the hydraulic conduits being broken away to reveal the boom structure with greater clarity;

FIGURE 3 is a median horizontal section, to an enlarged scale, of the shaker box mechanism;

FIGURE 4 is a section, the plane of the section being indicated by the line 4—4 in FIGURE 3; and FIGURE 5 is a diagrammatic showing of the eccentric weight members in attitudes of apposition and opposition.

While the tree shaker of the invention is susceptible of numerous physical embodiments, depending upon the environment and requirements of use, substantial numbers of the herein shown and described embodiment have been made and used, in the environment illustrated, and have performed in a highly satisfactory manner.

The tree shaker of the invention, generally designated by reference numeral 11 is preferably mounted on a self-propelled fruit catching apparatus 12, or catching frame. The apparatus includes a laterally inclined forward fixed frame 13, and after fixed frame 14, together with an inclined transversely slidable forward movable frame 15 and after movable frame 16, the frame 16 encompassing the trunk 17 of a tree to be harvested. Fruit or nuts dislodged from the tree fall onto the frames and roll down the frames to a centrally located conveyor belt 18 which conveys the crop rearwardly to discharge onto an elevator 19, thence into a bin 20 carried on the apparatus.

FIGURE 1 shows the catching frame in position preparatory for shaking to take place. In this situation, the operator of the shaker 11 is standing with his hands on the handles 22 and 23, the handles extending rearwardly from the shaker mechanism box 24. Projecting forwardly from the box 24 is the shaker boom 26, preferably constructed of a strong, fairly rigid pipe. At the forward end of the boom 26 is the tree-clamping jaw 27, the jaw 27 including a forward, fixed, hook member 28 and an after, movable hook member 29 slidable in the boom pipe in a fore and aft direction.

Clamping of the jaws is controlled from a trigger 32 on the handle 22. A conventional hydraulic plunger and valve arrangement, not shown in detail, serves to translate the jaw member 29. FIGURE 2 most clearly illustrates the hydraulic conduit connections 36 and 37 attached to a conventional hydraulic cylinder, not shown, within the pipe boom and which causes the jaw member to plunge in and out in dependence upon the operator's movement of the trigger 32.

As is shown in FIGURE 1, the jaw members 28 and 29 define an opening which is ordinarily slightly smaller than the diameter of the tree trunk 17. The reason for this is that experience has indicated that more efficient shaking, or greater yield, is effected by shaking, individually, the four or five main branches of the tree, rather than shaking the trunk. Shaking of the individual branches also results in less damage to the bark of the tree than does trunk shaking.

As can be visualized from FIGURE 1, the four or five main branches will ordinarily be located in a rough circle around the trunk 17 as a center. This requires that the clamping jaw 27 be moved sucessively from one location to another to clamp and shake the respective branches.

Provision is made for enabling the operator, with a minimum of fatigue, to shift the jaws and the boom structure to a wide variety of locations and boom attitudes and orientations. This feature of versatility and flexibility is of great importance since, as will be realized, the operator must project the front of the boom through the tree branches on the side of the tree facing him in order to be able to reach, clamp and shake the branches on the far side of the tree. To do this, an unusual degree of mobility of the boom is required.

Such mobility is achieved by pivotally mounting the boom 26, for vertical rocking movement about a horizontal transverse axis, on a fork 41, or yoke. The yoke 41, in turn, is pivotally mounted, to rotate about a vertical axis, on a block 42 mounted on the end of a link 43, or lever, extending in a generally transverse direction, the connections serving as a gimbal mounting.

In order to provide for maximum flexibility, the boom pipe 26 is rotatably mounted, for rotation about its own fore and aft, or longitudinal axis, in a sleeve, 46, or collar, to which the opposite tines of the fork 41 are secured. Translation of the boom pipe 26 within the sleeve 46 is prevented by any suitable element such as a pair of sturdy forward and after pins 48 secured to the boom and abutting each end of the sleeve 46.

The boom structure s so located with respect to the supporting sleeve and pivot as to balance the boom. In other words, the operator does not have to hold up any weight as he swings the boom around to various positions.

Furthermore, only a minimum of effort is required to swing the boom structure in a fore and aft and in a lateral or transverse direction.

As can be seen most clearly in FIGURE 1, the link 43 is pivotally mounted, for rotation about a vertical axis, on a pin 51 located on the forward end of a forwardly projecting arm 53.

The after end of the arm 53 is mounted securely on the upper end of a vertical standard 56, of sturdy pipe construction, the pipe 56 being pivotable about a vertical axis.

Power means are provided for rotating the vertical standard 56 to any selected angular position, this motion being accompanied, of course by a corresponding swinging movement of the arm 53. Such power means includes a crank arm 57 affixed to the standard 56 and projecting forwardly into pivotal connection with a plunger 58 extending from a hydraulic cylinder 59 having its opposite end pivotally mounted on a suitable fixed frame member 60.

Appropriate hydraulic elements of a conventional nature, and therefore not shown, are provided to enable the operator easily and quickly to swing the arm 53 to any selected orientation. Such elements would include a pair of hydraulic connections at opposite ends of the cylinder 59, together with any suitable hydraulic pump, motor and valving arrangement. These elements, in the main, can be found in the self-propelled harvesting apparatus itself or, if not, a separate hydraulic system can be used, and which could derive its power, for convenience, from the prime mover on the harvester itself.

Movement of the plunger 58 and positioning of the swingable arm 53 is preferably controlled from a location at or very near the operator's station, and which could be a lever on the top or side of the shaker box 24 or on the console 63', or control panel of the operator of the harvesting machine. Its precise placement is not critical so long as the shaker operator has ready access to the control element. The important aspect of this feature is that the shaker operator is readily and effortlessly capable of swinging the arm 53 to the orientation desired. This orientation, in turn, enables the operator easily and quickly to swing the lever 43 and the boom 26 to any position necessary to clamp the jaws on the branch to be shaken.

At the conclusion of shaking all of the branches, the boom and its attendant structure is ordinarily swung so that the boom approximately overlies the fore and aft conveyor belt 18 with the boom resting on a suitable cradle, not shown, and out of the general line of sight of the operator of the harvesting apparatus, so that he can observe the action as he retracts the movable frames and drives the machine on toward the next tree where the frames are extended in suitable order, so as to assume again the position shown in FIGURE 1, preparatory to shaking the branches.

Fore and aft shaking of the boom 26 is effected by the operator's actuating a trigger 63 on the operator's handle 23. The trigger 63 controls a suitable conventional valve, not shown, governing the flow of hydraulic fluid to a hydraulic motor 71 which, in turn, drives a gear shaft 72 journaled in bearings 73 mounted on opposite walls of the shaker box 24.

Keyed to the rotatable shaft 72 is a first gear 81 and a second gear 82. In driven engagement, as by a direct toothed engagement with the second gear 82 is a toothed gear 84 rotatably mounted on a transverse fixed shaft 86. A flange 87 on the toothed gear 84 has mounted thereon, in eccentric relation, an eccentric weight 91 secured by fastenings 90.

In driven engagement with the first gear 81, as by a drive element 89, such as a chain or toothed V-belt, is a third gear 83, having secured thereto, in eccentric relation an eccentrically disposed weight 92 secured by fastenings 93.

It is to be noted that while the embodiment shown in FIGURES 3 and 4 comprise a combination of a toothed gear and a chain drive, other types of driving elements could be utilized such as a combination of timing belts suitably arranged so as to rotate the eccentric weights in opposite angular directions.

The eccentric weights 91 and 92 are located in precise registry, when installed, as appears most clearly in FIGURES 3 and 4. In this position the centers of gravity of the two weights are disposed in a horinzontal plane including the longitudinal axis 96 of the boom 26.

The eccentric weights 91 and 92 assume the shape of generally V-shaped plates, are of metal, and are so disposed on the fixed shaft 86 that their adjacent walls are closely spaced together. The facing, or adjacent, walls of the weights are located very closely on each side of a vertical plane 97 passing through and coincident with the longitudinal axis 96 of the boom, the effect being that the two weights exert substantially their entire influence in the longituidnal central axis 96.

As the weights rotate, they assume, during one complete rotation, two positions of opposition and two positions wherein the plates are in registry, or apposition, as appears most clearly in FIGURE 5. The effect of these cyclical dispositions of the closely-separated weights is that the boom moves forwardly as the weights swing forwardly into apposition and, subsequently, the boom moves rearwardly as the weights swing rearwardly into apposition or registry. The result is a rapid, strictly fore and aft reciprocation with negligible lateral components of movement.

The extent and speed of the forward and rearward effort is a function of the speed of rotation of the shaft 72. This, in turn, is controlled by the operator who moves the trigger 63 in dependence upon the observed extent of shaking of the fruit or nuts from the tree branches.

The shaker box 24 and the boom 26, being secured to each other, partake of the same, rapid fore and aft, reciprocating movement. So, also, do the fork 41 and the link 43 undergo this motion. The movement of the link 43, however, is in angular reciprocation and is through a very small arc. Consequently, the arm 53 moves only a very slight amount.

All the necessary triggers for clamping the tree and shaking it are under the immediate control of the operator and the position of the supporting arm is governed by a control which is nearby. Consequently, a rapid, accurate tree shaking job can be effected.

What is claimed is:

1. A tree shaker adapted for use on a harvesting frame, said shaker comprising:
    a. a vertical standard pivotally mounted on the harvesting frame for rotation of said standard about a vertical axis;
    b. power-driven means on said frame for angularly positioning said standard about said vertical axis;
    c. a horizontal arm having one end mounted on the upper end of said standard, said arm being swingable about said vertical axis in unison with said standard;
    d. a link pivotally mounted at one end on the other end of said horizontal arm for rotational movement about a vertical axis independent of the movement of said arm;
    e. a gimbal mounted on the other end of said link;
    f. a boom mounted on said gimbal for freedom of movement about both a horizontal axis and a vertical axis, said boom being supported on said gimbal at a location intermediate the ends of said boom;
    g. a tree clamping member on one end of said boom; and
    h. means on the other end of said boom for axially reciprocating said boom and said tree clamping member.

2. The device of claim 1 wherein said tree clamping member and said boom reciprocating means are substantially counterbalanced on said gimbal.

3. The device of claim 1 wherein said gimbal includes a sleeve, and wherein said boom is journaled within said sleeve for rotation of said boom about its own axis.

References Cited in the file of this patent

UNITED STATES PATENTS

| | | |
|---|---|---|
| 1,472,262 | Abildgaard | Oct. 30, 1923 |
| 1,779,923 | Wagner | Oct. 28, 1930 |
| 2,500,168 | Du Pont | Mar. 14, 1950 |
| 2,627,849 | Carlson | Feb. 10, 1953 |
| 2,692,470 | Bowman | Oct. 26, 1954 |
| 2,700,268 | Lowe | Jan. 25, 1955 |
| 3,105,345 | Anderson et al. | Oct. 1, 1963 |